United States Patent
Bell, III et al.

(10) Patent No.: US 8,662,900 B2
(45) Date of Patent: Mar. 4, 2014

(54) DENTAL IMPLANT SURGICAL TRAINING SIMULATION SYSTEM

(75) Inventors: Fred Albert Bell, III, Fair Oaks Ranch, TX (US); Jeffrey A. Bassett, Vista, CA (US); Michael Collins, San Marcos, CA (US)

(73) Assignee: Zimmer Dental Inc., Carlsbad, CA (US)

( * ) Notice: Subject to any disclaimer, the term of this patent is extended or adjusted under 35 U.S.C. 154(b) by 625 days.

(21) Appl. No.: 12/790,140

(22) Filed: May 28, 2010

(65) Prior Publication Data

US 2010/0311028 A1 Dec. 9, 2010

Related U.S. Application Data

(60) Provisional application No. 61/184,073, filed on Jun. 4, 2009.

(51) Int. Cl.
*G09B 23/28* (2006.01)

(52) U.S. Cl.
USPC ............ 434/263; 434/262; 434/264; 600/301

(58) Field of Classification Search
USPC ................................... 434/262, 263; 600/301
See application file for complete search history.

(56) References Cited

U.S. PATENT DOCUMENTS

| | | |
|---|---|---|
| 3,780,439 A | 12/1973 | Manor et al. |
| 4,409,616 A | 10/1983 | Ledley |
| 5,688,118 A | 11/1997 | Hayka et al. |
| 5,704,791 A * | 1/1998 | Gillio ............................ 434/262 |
| 5,766,017 A | 6/1998 | Nevin et al. |
| 5,800,178 A | 9/1998 | Gillio |
| 6,088,020 A * | 7/2000 | Mor ................................ 345/156 |
| 6,224,373 B1 | 5/2001 | Lee et al. |
| 6,424,332 B1 | 7/2002 | Powell |
| 6,701,174 B1 | 3/2004 | Krause et al. |
| 7,001,270 B2 | 2/2006 | Taub |
| 7,084,868 B2 | 8/2006 | Farag et al. |
| 7,114,954 B2 * | 10/2006 | Eggert et al. .................. 434/262 |
| 7,121,832 B2 * | 10/2006 | Hsieh et al. .................... 434/262 |
| 7,133,042 B2 | 11/2006 | Anh et al. |
| 7,140,877 B2 | 11/2006 | Kaza |
| 7,249,952 B2 * | 7/2007 | Ranta et al. ..................... 434/263 |
| 7,292,716 B2 | 11/2007 | Kim |
| 7,373,286 B2 | 5/2008 | Nikolskiy et al. |
| 7,377,778 B2 | 5/2008 | Chishti et al. |
| 2004/0091845 A1 * | 5/2004 | Azerad et al. .................. 434/263 |
| 2004/0259057 A1 * | 12/2004 | Kim ................................ 433/213 |

(Continued)

FOREIGN PATENT DOCUMENTS

WO 2007121572 A1 11/2007

*Primary Examiner* — Xuan Thai
*Assistant Examiner* — Banafsheh Hadizonooz
(74) *Attorney, Agent, or Firm* — Schwegman, Lundberg & Woessner, P.A.

(57) ABSTRACT

A bone implant surgery system is used for simulating a dental surgical procedure having a display that shows placing a simulated bone implant at a simulated implant site on a living body by using a simulated surgical tool holding the simulated bone implant. At least one hand-held haptic device is used to control the surgical tool and at least one controller is specifically configured to cause movement of the surgical tool on the display based on motions of the haptic device and to cause haptic feedback to a user holding the haptic device depending on the position of the surgical tool on the display. A user may then review and evaluate the results of the surgical simulation.

22 Claims, 13 Drawing Sheets

(56) References Cited

U.S. PATENT DOCUMENTS

| | | |
|---|---|---|
| 2005/0233290 A1 | 10/2005 | Jackson |
| 2007/0040854 A1 | 2/2007 | Lievin et al. |
| 2007/0178429 A1 | 8/2007 | Bell |
| 2007/0190492 A1 | 8/2007 | Schmitt |

* cited by examiner

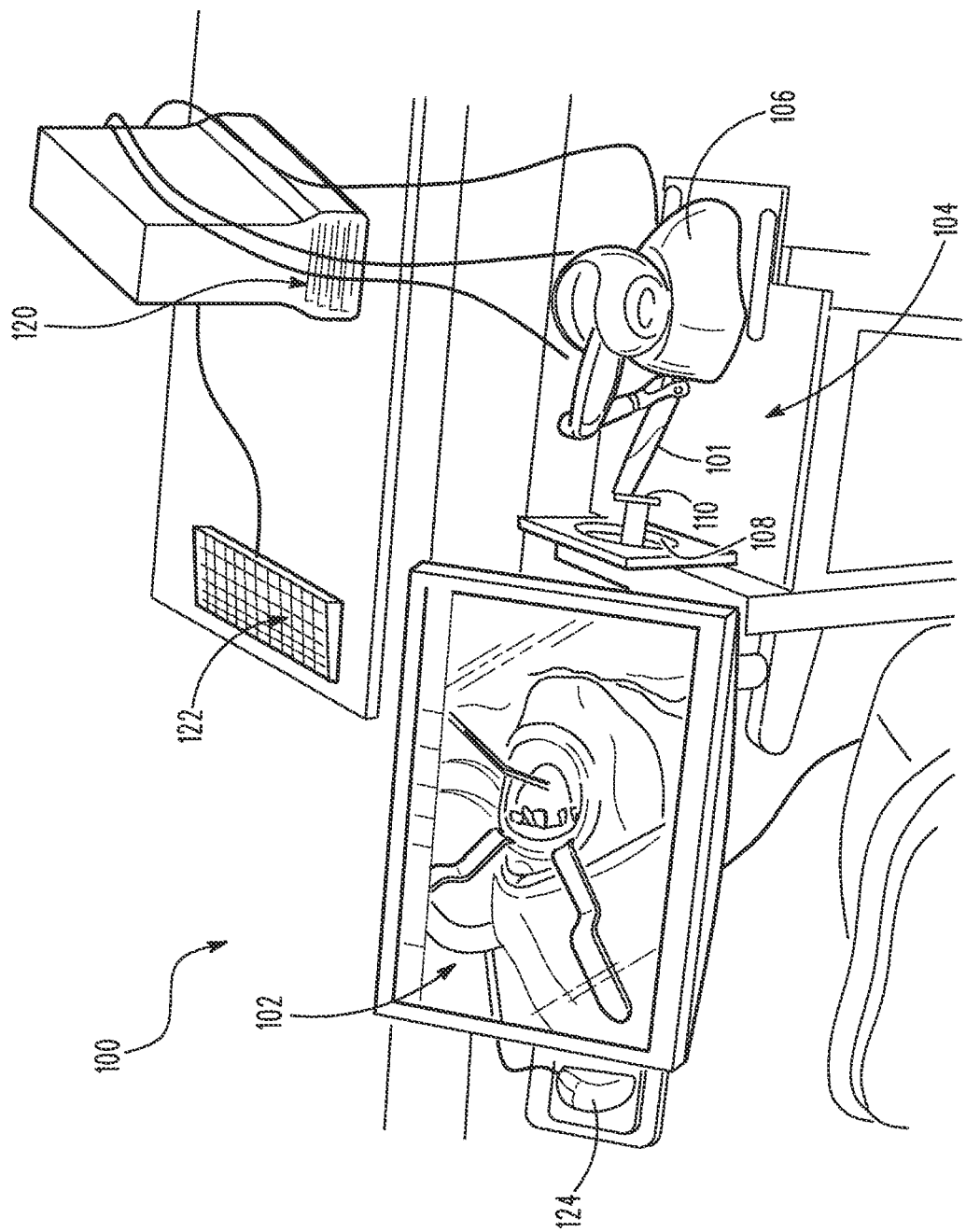

DENTAL IMPLANT SURGICAL TRAINING SIMULATION SYSTEM

RELATED APPLICATION

This application claims the benefit of prior provisional application Ser. No. 61/184,073, filed on Jun. 4, 2009.

FIELD

The present invention relates to systems for training surgeons to perform bone implant surgeries, and more particularly, to virtual reality computer training systems that provide graphic simulations of a bone implant surgery and that provides a user feedback through a computer interface tool representing a simulated surgical tool displayed in the simulation.

BACKGROUND

Obtaining a basic level of competency in dental implant surgery, as well as developing higher skill levels and performing more challenging and advanced dental implant surgical techniques, is usually achieved through practice and repetition. For the new clinician or student, this learning process should ideally be supervised by an expert mentor or instructor in the skill being practiced. Current training methods for dental implant surgical techniques include the use of artificial physical models, cadavers, and selected non-human anatomical parts such as pig jaws and bovine bones. The resources needed for these training sessions and techniques are often expensive and of limited availability such that multiple practice sessions are impractical or extremely difficult. The tremendous variation in specimen availability makes it difficult to provide consistent education or experiences among students in a training environment. Furthermore, it is also almost impossible to match the training specimen with the student's skill level for more than a few course participants. Thus, a cost effective training system is desired that provides consistent, realistic learning experiences that are appropriate for the student's skill level.

Virtual Reality ("VR") simulators can allow a user to interact with a virtual 3D environment. Different imaging devices and techniques may be used to obtain images of the body or body parts for use in creating a 3D virtual environment. Currently, imaging devices are known to deliver detailed images of both hard and soft tissue, and these images can be used to generate a 3D image of the entire head or other part of the body. These files could conceivably be incorporated into a VR simulator and manipulated with a software program to produce a VR simulator. However, these files are extremely large, and to operate in real time is not practical on a dental or medical office computer, within the foreseeable future. As a result, a need exists for a surgical simulator that will provide a user real time control and virtual simulation.

Moreover, VR systems associated with dentistry allow a user to interface with a virtual dental environment. For example, U.S. Pat. No. 7,001,270 discloses a computer virtual dental game that a user may perform multiple tasks pertaining to different dental conditions within a virtual environment. The program is designed to permit the user to play various games on a monitor associated with different dental conditions by using a keyboard, joystick, or mouse to interact in a virtual environment. In one instance, a user may move or align a tooth to a proper location by using a mouse to point to a tooth and dragging the mouse within a permitted limit to readjust the tooth. Although this allows a user to interact within a 3D environment, the user is merely playing a game and not engaging in realistic virtual training exercises. This computer virtual dental game may be used, such as by children, to increase dental knowledge but is not designed to develop, practice and refine actual surgical skills and techniques for practitioners, nor does it provide actual real life feedback, such as haptic feedback, when interacting in a 3D environment. As a result, a need exists for a surgical simulator that will provide a realistic surgical environment, including real life-like feedback.

BRIEF DESCRIPTION OF THE DRAWINGS

FIG. 13 is a perspective view of an alternative configuration of the components of the training system of the present invention.

DETAILED DESCRIPTION OF THE PREFERRED EMBODIMENTS

Figure 1:
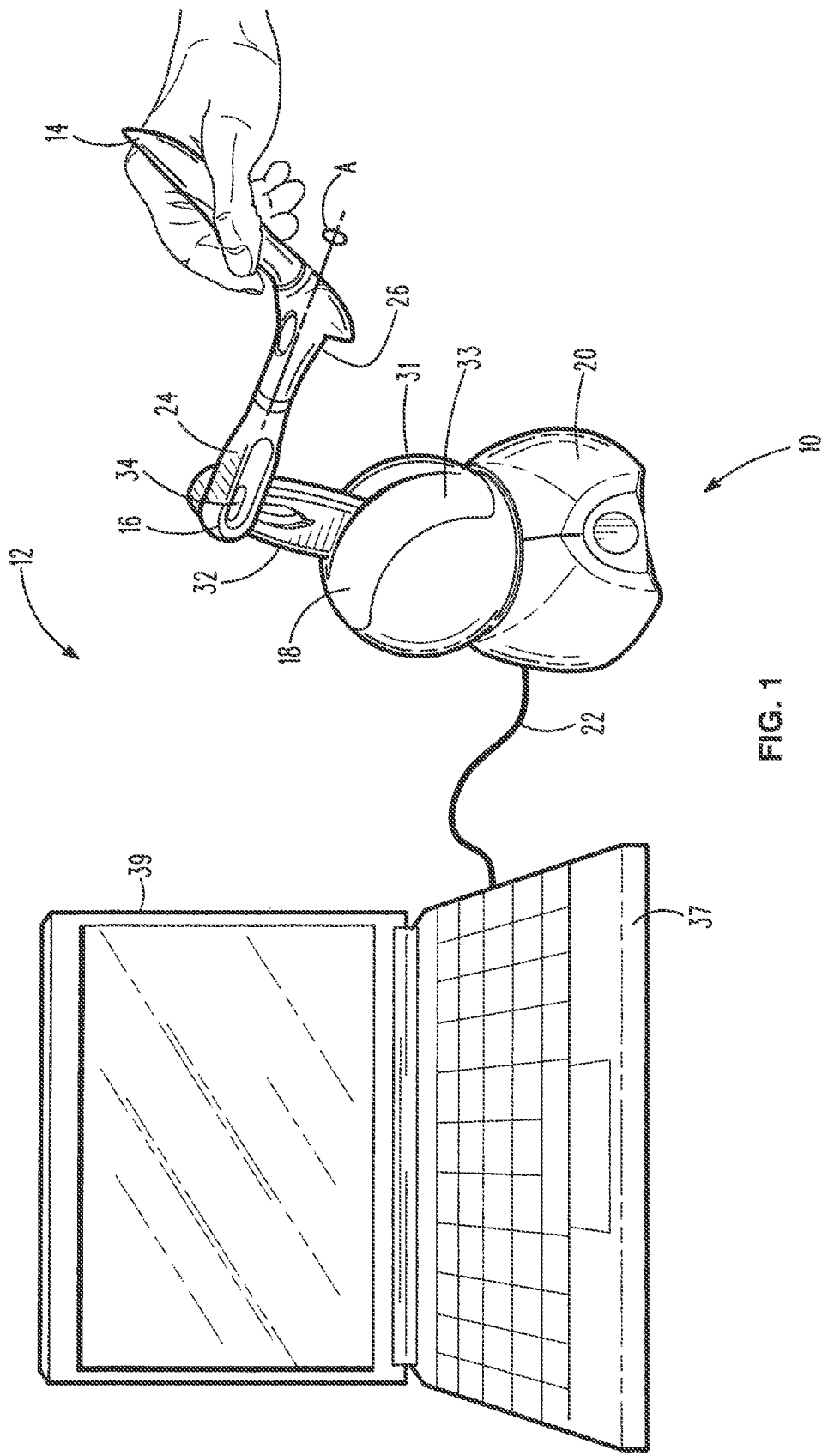
FIG. 1 is a schematic of a bone implant surgery training system embodying features of the present invention.
Figure 2:
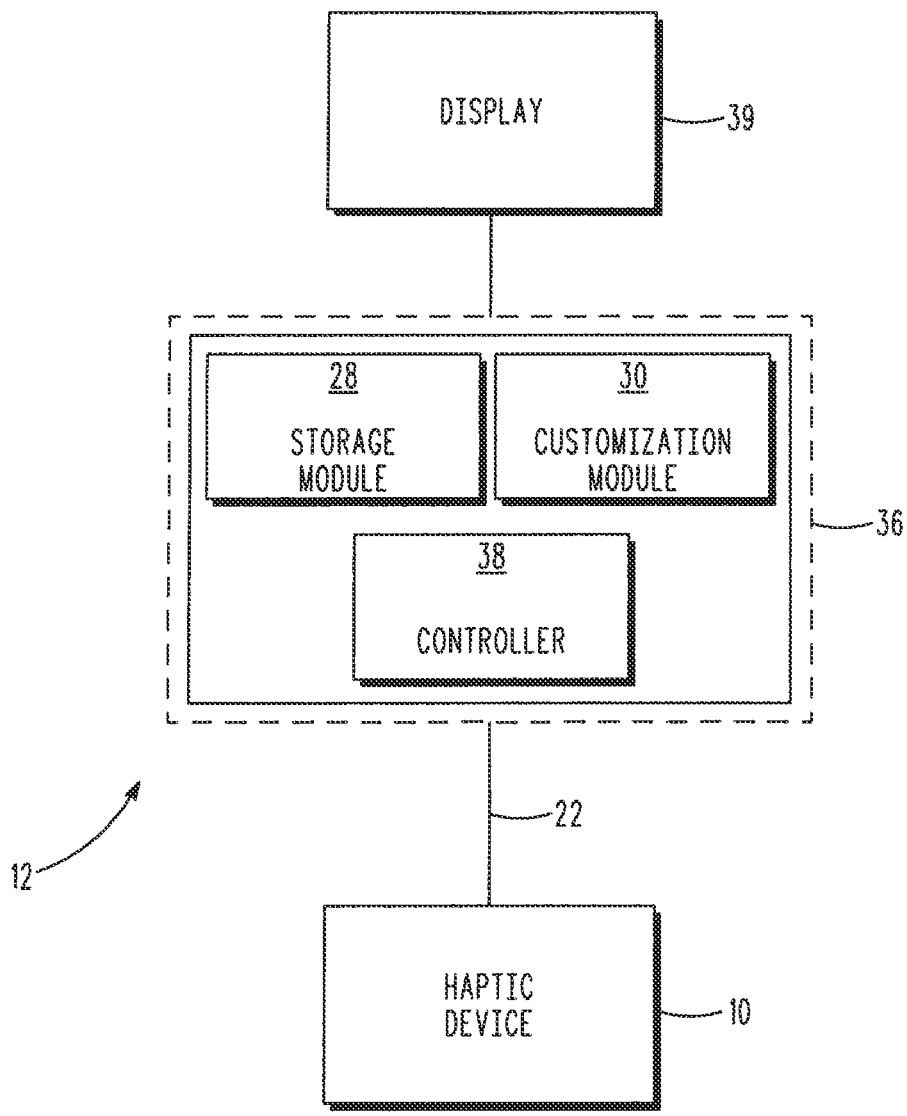
FIG. 2 is a block diagram of hardware components of the bone implant surgery training system embodying features of the present invention.
Figure 6:
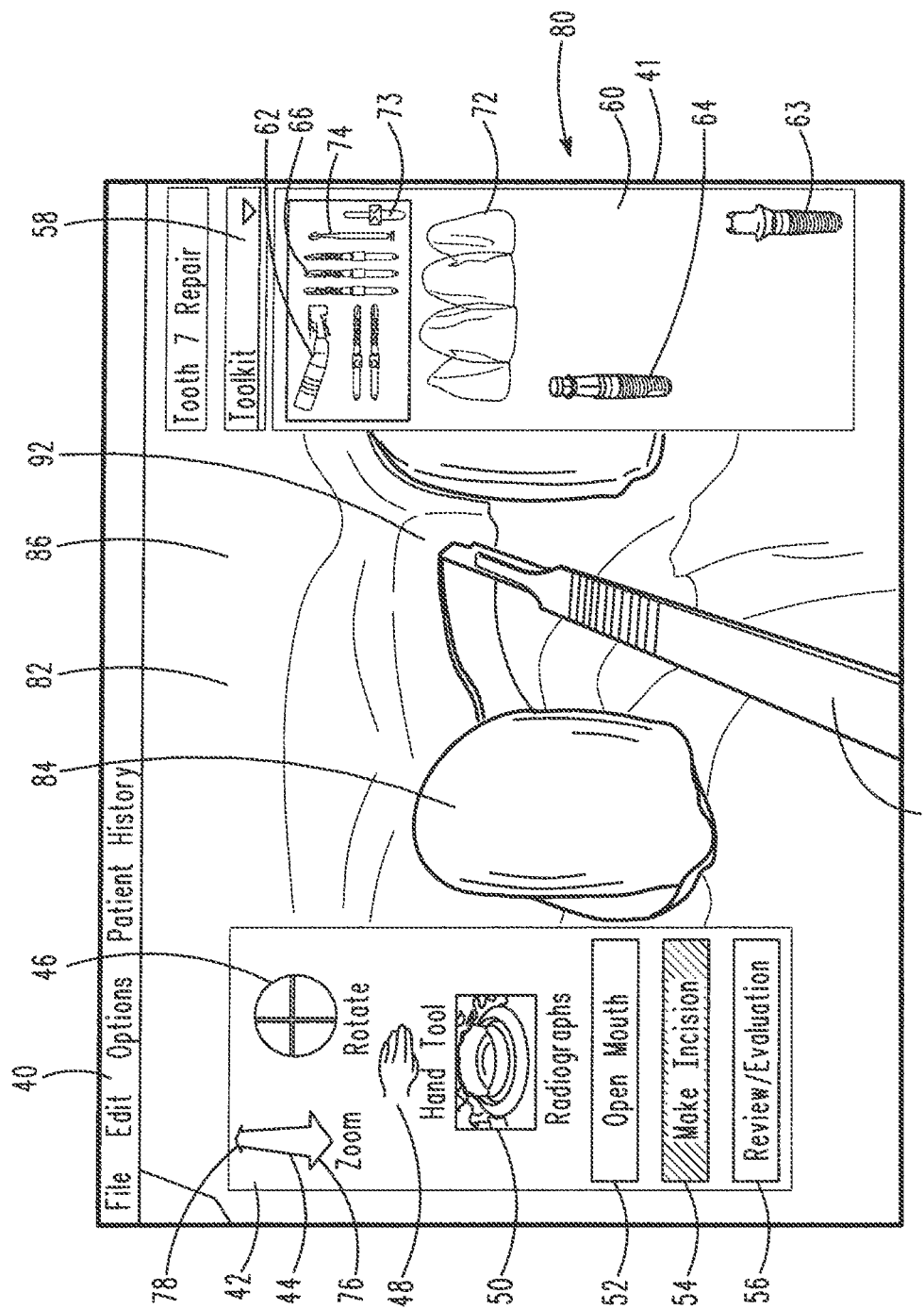
FIG. 6 is another computer screen display view of the bone implant surgery training system showing an incision process embodying features of the present invention.

Referring to FIGS. 1-2, a system 12 is used for simulating a bone implant surgery having a display 39 and a controller 38. The display 39 shows a simulated implant site, a simulated bone implant, and a simulated surgical tool (FIG. 6). A hand-held haptic device 10 or multiple haptic devices are used to control the simulated surgical tool to perform the simulated bone implant surgery. The controller 38 interacts with the hand-held haptic device or devices 10. The display 39 is configured to cause movement of the surgical tool on the display based on motions of the haptic device 10 and to provide feedback to a user holding the haptic device 10 depending on the position of the surgical tool. In another embodiment, multiple haptic devices may be used to interact with the controller 38 to perform the virtual surgery.

The haptic feedback device 10 is capable of providing an individual virtual access to a three-dimensional ("3D") environment. Such haptic devices may serve as surgical dental educational or training tools providing a user the ability to practice procedures within a virtual environment using a virtual dental implant surgical simulator or system 12. A virtual dental implant surgical simulator 12 can provide a realistic, cost effective, and efficient method to obtain, practice and refine surgical skills with concomitant instructional feedback and evaluation. This technology allows the user to practice various surgical procedures surrounding dental operations including creating lines of incision and creating osteotomies for implant placement in either a 2D or 3D environment. The concomitant use of two appropriately shaped haptic devices 10 will allow the operator to perform bi-manual procedures e.g., after making an incision, the operator will be able to reflect the tissue with an instrument, such as a periosteal elevator, and then retract that tissue with a retractor of some type while preparing an osteotomy.

The use of a haptic feedback device 10 will allow the user to "feel" the various densities of bone when preparing osteotomies and to angle the drill appropriately for ideal placement of the implant. Various virtual scenarios also can provide anatomical challenges to the user, including making an incision at an implant site located within a mouth or placing implants in close approximation to vital anatomical structures, such as nerves, vessels, sinuses, the floor of the nose and adjacent teeth, or performing the surgery on a patient with a limited oral opening. Additionally, it may be possible to perform other surgical procedures using this system, including adjunctive implant surgery such as sinus lift procedures and bone and soft tissue grafting, for example.

The haptic feedback device 10 interacts with a processor unit 36 which presents a virtual image on the display 39 and allows the user to touch, manipulate, and interact with virtual objects within a virtual environment. The processor unit 36 may be a central processing unit ("CPU") located in a laptop computer 37 or desktop computer, or other device whether hand-held or not, and which may display the virtual environment on a monitor screen or other display. The haptic feedback device 10 may be connected to the processing unit via a connector 22. In one example, the connector 22 may be a USB cable or coaxial cable or other cable that is known in the art. In other examples, the haptic feedback device 10 may communicate wirelessly with the processing unit 36, which permits the user to be free from constraint of wires or associated cables. In one example, the display may be head mounted such that the virtual image may be presented on a display screen located on a virtual reality helmet, eyeglasses, or other headgear. This allows the user to perform the surgical simulation while in a complete virtual world.

The haptic feedback device 10 allows a user to touch and manipulate virtual objects within the virtual environment. Preferably, the device 10 will have an outward appearance and general feel of the type of surgical instrument typically used to perform the desired dental surgical procedure. Features of the drill or other instruments represented by the haptic device 10 requiring an on/off or variable degrees/speeds of operation can be controlled via a mouse, keyboard or foot controlled devices. The haptic feedback device 10 may take the form of a variety of different haptic devices known in the art, including the Phantom Omni® haptic device manufactured by SensAble Technologies Inc. located in Woburn, Mass., 01801.

The haptic feedback device 10 includes a stylus 14 which connects to a connector assembly 16. The stylus 14 attaches to the connector assembly 16 at an end of an extension arm 24. Extension arm 24 includes a pair of prongs forming a yoke 26 that extends outwardly from another end of the extension arm 24. The stylus 14 is joined to the connector assembly 16 by a pivoting connection to the yoke 26. In one example, the stylus may be snapped, screwed, or otherwise connected to the yoke 26. The connector assembly 16 includes another arm 32 joined to extension arm 24 at joint 34. The connection between the extension arm 24 and the lower arm 32 at joint 34 allows the stylus 14 to pivot within a generally vertical plane by moving the extension arm 24 about the joint 34.

The connector assembly 16 is mounted to a haptic controller 18 that rests on a haptic mount 20. The haptic controller 18 has a generally spherical shape and an arcuate slot 31 that extends partially around the outer periphery 33 of the haptic controller 18. The lower arm 32 connects to haptic controller 18 at a location within the slot 31 such that the lower arm 32 is able to move along a path defined by the slot 31. This guided movement allows the stylus 14 to be moved in a direction towards or away from the user.

The haptic controller 18 is mounted so as to swivel about the haptic mount 20 with 360 degree freedom. This freedom allows the user to move the stylus 14 360 degrees in a generally horizontal plane. It will also be understood that the stylus 14 may rotate about a longitudinal axis A generally defined by the extension arm 24 so that the stylus 14 can be tilted left or right. The connections between the styles 14 and the base 20 provide the stylus with a complete repertoire of degrees of freedom necessary to stimulate dental surgical procedures and to fully interact with the 3D environment.

In another example, the haptic controller 18 may include a finger mount. The finger mount may be attached to the controller 18 or a distinct and separate unit. Oftentimes, a user will use two hands while performing an operation. Generally, one hand is used to operate a handpiece while the other hand holds the patient's mouth, tongue, or other parts. The finger mount or rest may be a haptic device that corresponds to an area or part of the patient's mouth. The finger rest therefore allows virtual interaction with different areas of the patient's mouth by touching, contacting, or applying pressure to the finger rest.

Referring to FIG. 13, in one alternative example configuration, a virtual patient orientation 100 has a haptic device 101 similar to haptic device 10 and located in a set relationship relative to the monitor 102 and the virtual patient via a virtual surgical site orientor 104. The orientor 104 comprises a base 106 that holds the haptic device 101 in a set position, a ring 108 which defines the general opening of the virtual patient's oral cavity, and a secondary strut 110 which represents the patient's gums (gingival) or one or more teeth, and as such may be used as a rest for the operator's fingers or hand when using the haptic drill or other instrument. This action helps to replicate or simulate the position clinicians often employ when using teeth or gums, adjacent to the surgical site, as a "finger rest", thereby providing additional stability for holding an instrument such as a surgical handpiece when drilling. The virtual surgical site orientor 104 also provides a set reference for the computer and operator when orienting themselves and instruments to the virtual world and the surgical site as projected on the screen or virtual reality display. The virtual patient orientation 100 may also include a computer 120 with a keyboard 122 and mouse 124 as described for many of the embodiments herein.

The processor 36 is connected to haptic device 10 by connector 22, receives information from the haptic device 10, and processes the information to be presented on the display 39. In one example, the processor may be an Intel® Core 2 Duo Processor manufactured by Intel Corporation located at 2200 Mission College Boulevard in Santa Clara, Calif., 95054.

The processor 36 may include the controller 38 and may be operatively connected to a storage module 28 and a customization module 30. The controller 38 may use output information data presented from the haptic device 10, and process and display that output information data on the display device 39. The storage module 28 and the customization module 30 may be located within the processor 36, and connected to the controller 38 through a circuit board connection. In another example, both the storage module 28 and the customization module 30 may be a periphery device located outside the processor 36 and connected via a USB cable or any connection device known in the art to the processor 36. Both the storage module 28 and the customization module 30 may be a programmable storage memory as known in the art capable of storing preprogrammed information.

The virtual dental implant surgical simulator 12 may use actual digital imaging data from an actual patient and allow a user to practice an upcoming or proposed surgery prior to the real operation. This would be of particular benefit not only to a less experienced clinician but, also, to the experienced clinician who is faced with a particularly challenging procedure. The digital imaging data of a patient is produced by taking at least one CAT scan image of the area where the surgery is to be performed. Alternatively or additionally, other imaging data may be used such as from an MRI or scanned image of a surface model of the surgical site. This data is then used to virtually reconstruct the patient's actual mouth cavity to be used in the virtual simulation. Such data may include a specific patient's jawbone formation, teeth structure and formation, gumline, bone tissue, or other data pertaining to the patient's specific mouth cavity formation. Additionally, the digital imaging data may be compatible with other Cat Scan Imaging Systems such as SimPlant or i-Cat. In another example, this data may be useful for creating a prosthesis for the patient after the surgery has concluded.

To provide efficient operation of the system, it is possible to streamline and combine data to simplify the total data necessary to produce the virtual dental surgical simulation without negatively impacting the surgical practice value or virtual realism of the experience. In one example, a surgery may only focus on a specific area of the patient's mouth and, therefore, only require the virtual dental implant surgical simulator 12 to provide a high detail view of that specific area of the mouth. In this example, scanned data pertaining to areas of the mouth that are not specifically useful for the current surgery may be digitally diluted to provide only a superficial low detail view of the patient's anatomy. The high detail area may be generated by using voxel data associated with the specific area of the patient's mouth where the simulated procedure may occur. In order to maximize simulation efficiency, the high detailed area may be generated by using voxel data which can be used to control the haptic devices to provide a realistic feel to penetrating and manipulating the "virtual operating area." The data specifically simulates a high detail view of only a single implant site where the particular simulated surgery is occurring at that specific time. This allows the system to focus on the areas most important for the particular dental simulated surgery and permit the system to operate with increased efficiency.

In another example, the virtual soft tissue of a patient may be a composite of a generic soft bone tissue and the actual patient's digitally scanned soft bone tissue. In general, portions of the oral cavity relating to the mucosa overlying alveolar bone of the maxilla and mandible may be very similar among most patients. This allows the virtual dental surgical simulator 12 to combine a generic soft bone tissue pertaining to the oral cavity and the exact soft bone tissue pertaining to the actual patient. In this example, the soft bone tissue may be 2 mm deep at a known point in the mandible in the majority of patients. The virtual dental surgical simulator 12 will automatically incorporate soft bone tissue having that depth and combine that bone tissue with the actual patient's scanned digital data to incorporate important patient specific attributes such as the boney anatomy located within the oral cavity. This combination allows the virtual surgical simulator to reduce the amount of scanned data needed to produce a virtual simulation of a patient's oral cavity therefore allowing the system to function efficiently, while not sacrificing any training experience or resulting feedback to the user.

The actual digital imaging data may be stored within the storage module 28. The storage module 28 also may include data relating to nonphysical properties of a specific patient, such as a patient's medical history, known allergies, and illnesses. In another example, storage module 28 may include information pertaining to a patient's treatment plan or procedure. The processor 36 will access the data contained within the storage module 28 and provide the user access to this data using the virtual dental implant surgical simulator 12. So configured, a user will be able to access and upload a patient's digital data to the virtual dental implant surgical simulator 12 and use that data to practice a specific patient's planned surgery within a virtual environment.

The virtual dental implant surgical simulator 12 may allow a user to customize the virtual simulation to specific parameters. In particular, the surgical simulator 12 may allow a user to select a specific type of surgery or a specific type of patient for which to perform a surgical procedure. The customization module 30 may store information pertaining to various dental surgeries and scenarios. In one example, the customization module 30 may have a variety of different types of surgeries that are preloaded and that a user may select. In this example, the preloaded surgery may include a virtual model 80 (FIGS. 4-12) that has a specific problem for the surgery to address, a specific set of tools on display for the user to use during the surgery, and any other accessories or applications specifically pertaining to the preloaded surgery. In another example, the customization module 30 may include stored surgery scenarios. For instance, a user may select a stored scenario where a patient is missing a particular tooth or a specific set of teeth. The customization module 30 may be connected to the processor 36 and allow the user to access and select the information stored within the module 30 and select a specific dental simulation. In another example, the customization module 30 may allow the user to select specific parameters pertaining to a dental virtual simulation that is not predefined. Instead, the user can select each item pertaining to the virtual simulation individually to arrange for a more specific type of procedure.

Figure 3:
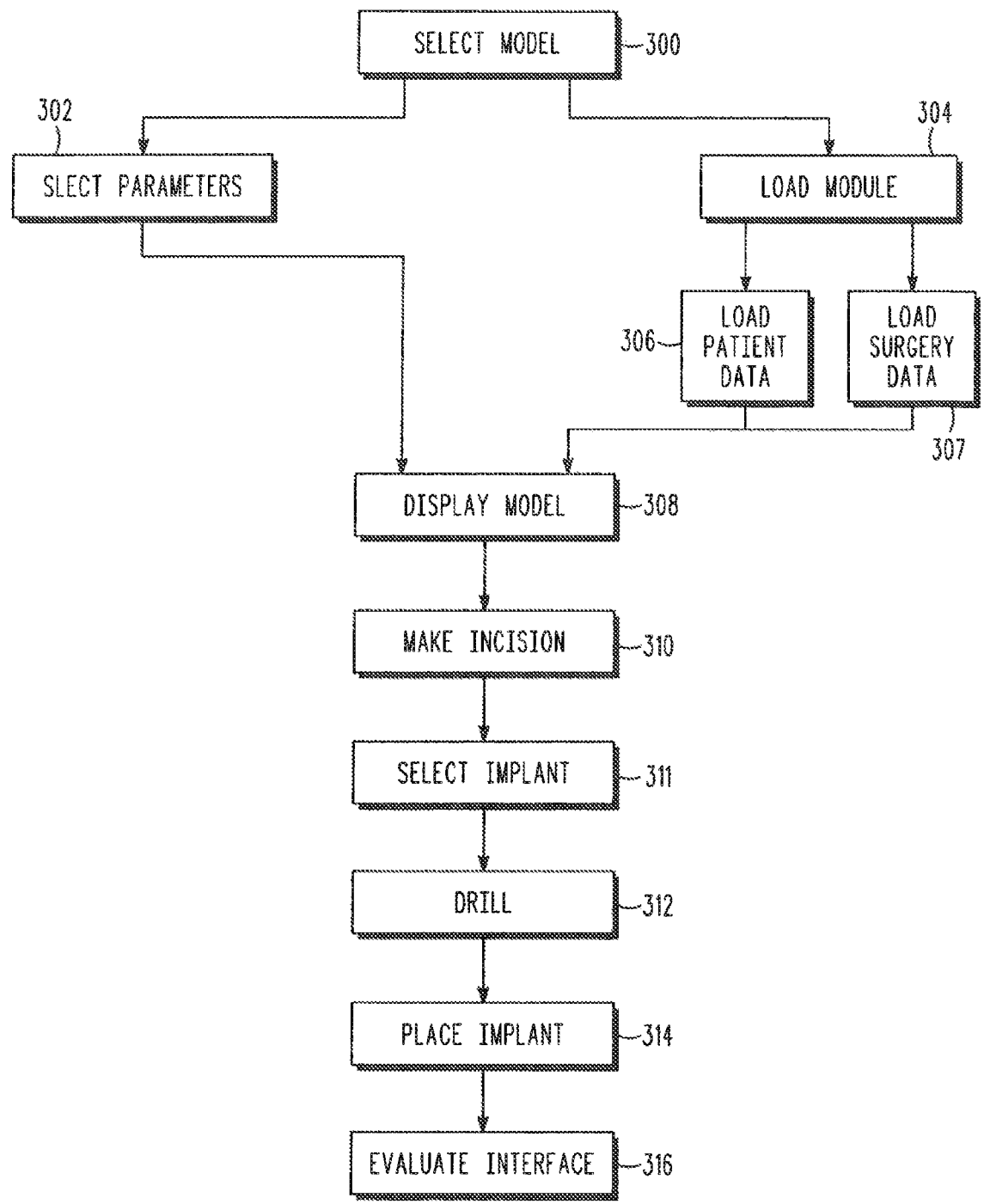
FIG. 3 is a flow chart diagram of steps of the bone implant surgery training system embodying features of the present invention.

An overview of the stages of a virtual dental implant surgical simulation is shown in FIG. 3. A user will select 300 a model for a surgery to be performed. The user can choose to select 302 parameters of a model based on the type of surgery that a user wishes to perform. This provides the user the ability to select the exact specifications for a surgical procedure. Furthermore, this customization allows the user to choose the type of surgery that will be performed, the type of jawbone, teeth, drill sites, tools to be used, and other features and characteristics associated with the model that will be performed during the virtual surgical simulation.

Alternatively, a user may choose to load 304 a preprogrammed module, such as the storage module 28 or the customization module 30 described above. This module may include data that pertains to a preconfigured simulation. This allows the user to forgo customizing the model to exact specifications and instead, the user can simply load the preprogrammed specifications within the module and proceed forward with the simulation. In one example, the user can choose to load 306 patient data from the storage module 28 as described above. This allows the simulator to access the storage module 28 and recall stored data pertaining to a specific patient thereby allowing the user to practice a surgical procedure within the virtual environment based on a patient's specific attributes and characteristics. A user can also choose to load 307 other prestored surgery data scenarios.

Both the storage module 28 and the customization module 30 may be separate and self-contained devices, such as DVDs, disks, flash drives, or other storage units that may be connected to the processor unit 36 via a USB connector or any other convenient connection known in the art. This configuration allows the modules to be easily transferred and connected to different processors thereby allowing the user to utilize the specific preprogrammed modules with a variety of different computers and dental implant surgical simulators. The transferability of these modules could allow them to be sold as separate units permitting a potential buyer to choose to buy the actual module based on its preprogrammed information. Once purchased, the buyer will connect the module to the buyer's dental implant virtual simulator and be able to conduct the virtual simulation with the data and information stored in the purchased module. In another example, the buyer also may buy a module online that contains a specific preprogrammed package. The buyer would purchase the module and then download the module using an internet connection to obtain access to the data and information. The buyer would be able to install the download on the buyer's computer and then be able to conduct a virtual simulation with the dental implant virtual simulator and the data and information from the downloaded module.

Both the storage module 28 and the customization module 30 may contain preprogrammed information and be configured to allow interaction with other types of haptic devices. In one example, the module will contain preprogrammed data and information pertaining to a surgical procedure and will include an interface that is compatible with a known haptic device or multiple haptic devices. In one specific example, the module may be compatible with a haptic device such as a Wii controller for the Nintendo Wii System. In this example, the module will be compatible with the interface associated with the Nintendo Wii System therefore allowing a user to select information and data from the module using the Wii controller and allowing the user to conduct the virtual simulation by using the Wii controller as the haptic device. The module also may be compatible with similar interfaces of other computer systems or gaming units allowing the module's information and data to be accessed by the computer systems or gaming units to conduct the virtual surgical simulation.

The display interface allows the user to view a displayed model or virtual patient presented on the screen during the virtual dental implant surgical simulation. The model is displayed 308 after the user inputs the specific customizations or loads the proper information and data from the storage module 28 or the customization module 30.

Figure 4:
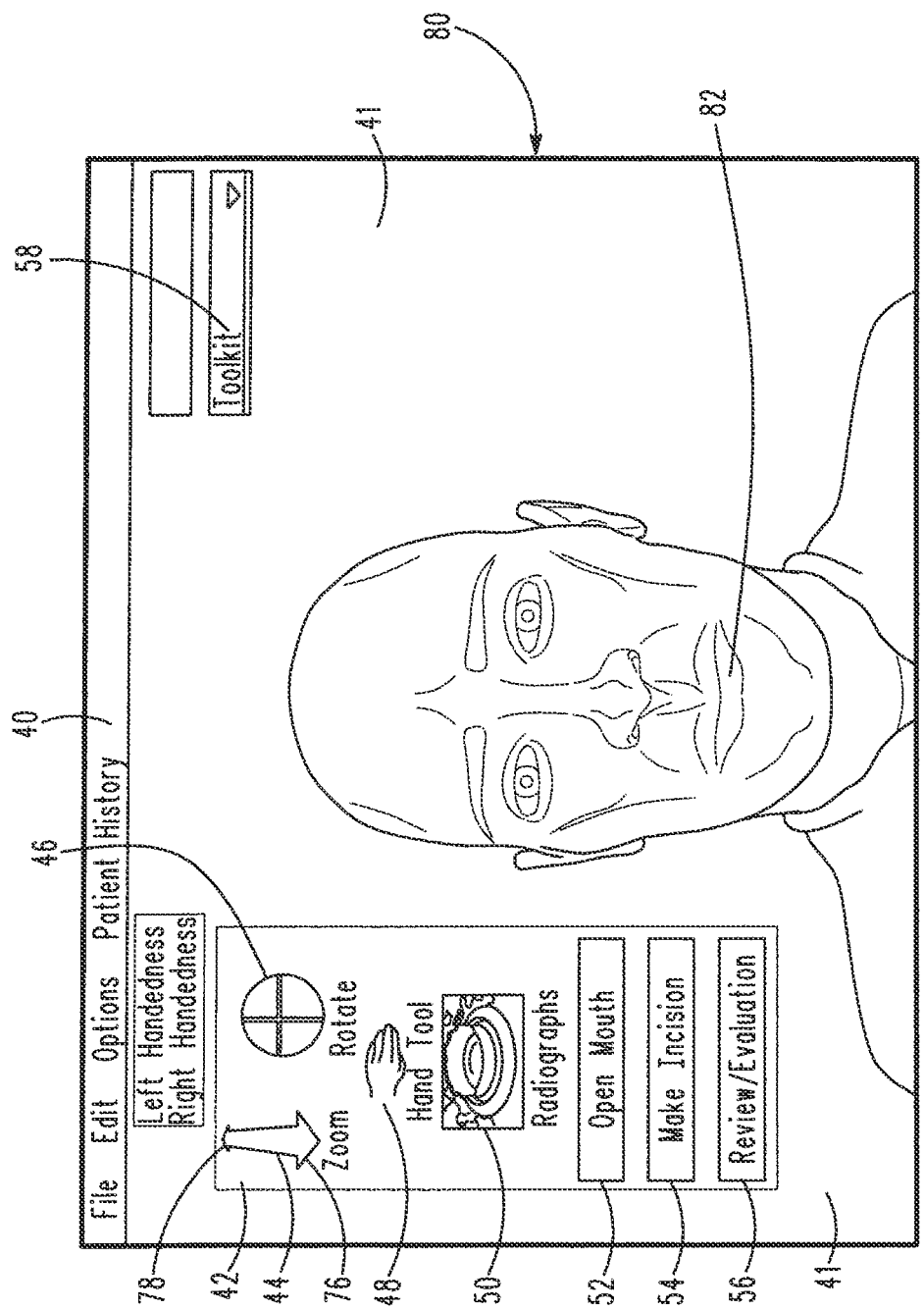
FIG. 4 is a computer screen display view of the bone implant surgery training system embodying features of the present invention.

As illustrated in FIG. 4, the model 80 may consist of features associated with a human neck and head including eyes, ears, nose, cheekbones, forehead, mouth, as well as other features. The specific attributes of each model will vary depending on the customization the user chooses for the model or the type of information and data that is loaded from the storage module 28 or the customization module 30. In one example, the display will show an implant site located within the mouth of the model 80. The mouth of the model 80 will include realistic features on the surface thereby providing the user with a realistic virtual experience. The location of the implant site, however, will include noticeably more detail under the surface of the implant site. This detail includes data that will allow the user to feel the hard bone beneath the implant site during the virtual simulation.

The user may interact with the displayed model 80 by maneuvering the haptic device 10. In one example, a corresponding icon, such as a simulated surgical tool, may move on the display screen in response to the movement of the haptic device 10. In another example, the user may interact with the displayed model 80 by using a keyboard, mouse, or other device. This allows the user to not only perform key tasks surrounding the virtual surgery, but allows the user to manually manipulate the model, manipulate a toolbar 40, or the icons located in a control box 42, or other icons presented on the display.

The toolbar 40 located at the top of the screen allows a user to open and upload different files, edit various features, change options, access patient history, and select other features pertaining to the virtual simulation. The toolbar may also allow the user to select other options pertaining to the simulation. The "Options" menu gives the user the ability to choose a view of the model from the perspective of a right-handed or left-handed user. This allows a user to increase the realistic nature of the simulation by customizing the standpoint of the simulated procedure to account for the dominant hand that a user will use when conducting the procedure.

The display screen or interface 41 forming the model 80 and background next to model 80 contains the control box 42 which contains various buttons that the user can click on to interact with the simulation. The buttons may include a zoom 44, rotate 46, hand tool 48, radiographs 50, open mouth 52, incision 54, and review/evaluate 56. Additional or different buttons can be provided as needed for specific simulations.

As illustrated in FIG. 6, a toolkit bar 58 may appear on the display screen. Selection of the toolkit bar 58 will cause the display to show a toolkit 60 that contains the necessary tools a user may use to perform a virtual surgery. The toolkit 60 may include a variety of tools, including an armamentarium or other necessary accessories that a user will need to perform a surgical procedure. In one surgical example (as specifically shown in FIG. 6), the toolkit 60 may include a drill hand piece 62, implants 63, 64, drill bits 66 and burs, a surgical guide 72, a guide pin 73, abutments, a drill extension, bone taps, and other tools associated with dental surgical procedures. These surgical tools and utensils may be selected by the user individually or in combination thereof to perform the virtual surgery.

The zoom button 44 allows the user to adjust the focus on the model 80. The user may actuate the bottom arrow 76 using the haptic device 10 to cause the view of the model 80 to zoom closer and focus on a specific feature of the model at a close range. The user can actuate the top arrow 78 to zoom out and provide a view of the model 80 from further away.

The rotate button 46 allows a user to control the direction and angle at which the model 80 is viewed. The rotate button 46 is divided into four quadrants. In one example, a user may select the upper right quadrant of the rotate button 46 to cause the view of the model to rotate toward the upper right direction of the display screen. Similarly, the user may select other quadrants of the rotate button 46 to cause the model to rotate in the corresponding direction. The rotate button 46 will therefore allow the user to change the views of the model from different angles.

The hand tool button 48 allows the user to select items and interact with items on the display screen 41. The hand tool button 48 may allow the user the realistic ability to interact with the model 80. During an actual surgical procedure, the practitioner is able to physically touch and adjust the patient's face and other body parts to properly perform the procedure. The hand tool button 48 may allow the user to have similar control over the virtual model. In one example, a user may select the hand tool 48 and use it to turn and tilt the model's head on the neck joint. In another example, the user may use the haptic device, mouse, or keyboard to select and rotate or position the head in a proper orientation. This permits the user to guide the head to a suitable position to perform the surgical simulation.

The radiographs button 50 allows the user to view x-rays corresponding to the patient. For example, the radiograph button 50 may be selected during surgery to change the display showing the simulated model to a display showing the corresponding x-rays associated with the patient. A user may therefore view a patient's x-rays to see bone and mouth structure associated with the patient and then immediately switch back to the display showing the simulated model.

Figure 5:
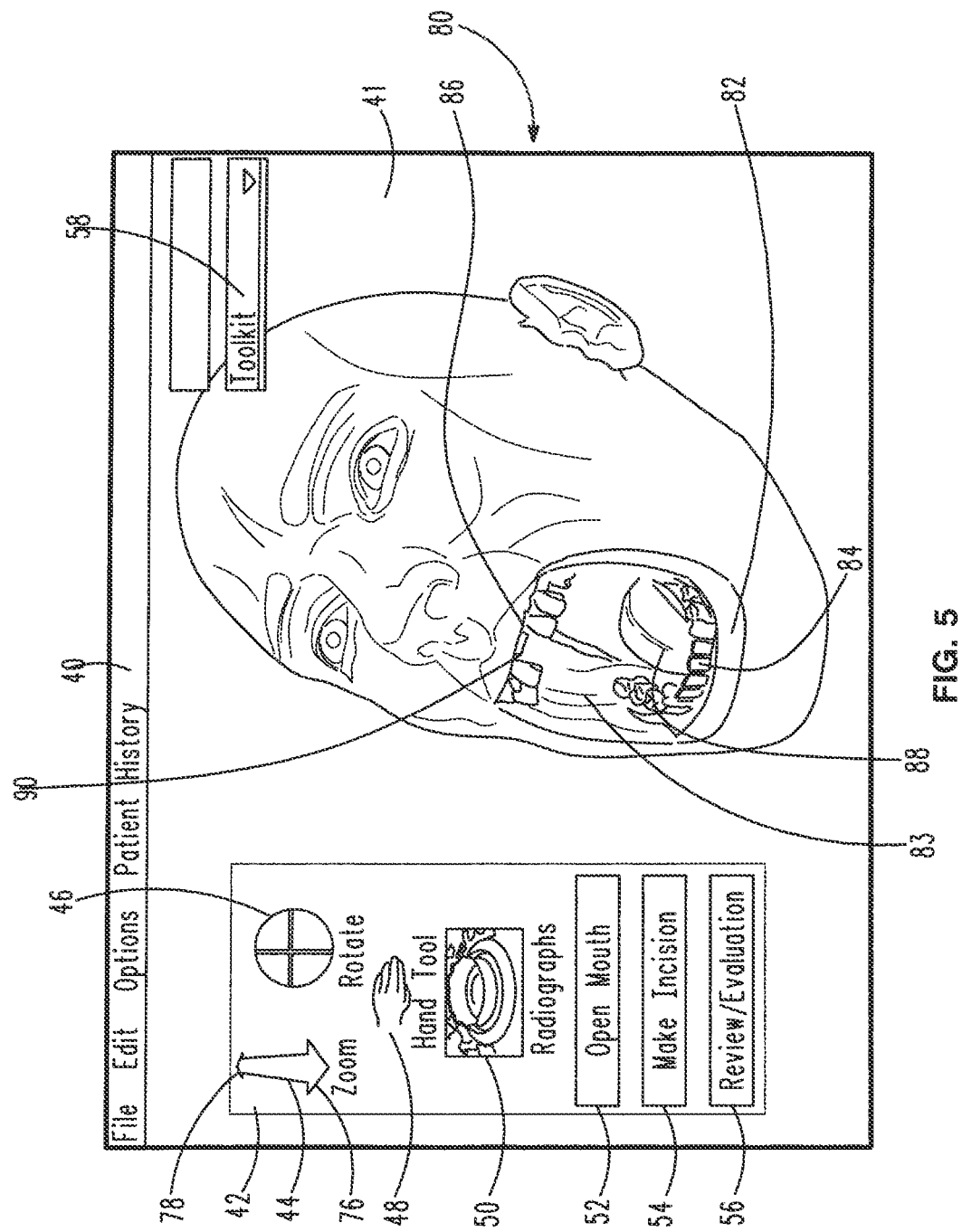
FIG. 5 is another computer screen display view of the bone implant surgery training system embodying features of the present invention.

Referring to FIG. 5, a user may click on the open mouth button 52 to move the model's mouth 82 to an open position. This allows the practitioner to view the inside 83 of the mouth, including the teeth 84, gums 86, tongue 88, and other features located within the mouth of the model 80. The user may select the zoom button 44 located in the control box 42 to focus in at a location on the open mouth 82 or inside 83 of the mouth 82. This allows the user to inspect the inside 83 of the mouth 82 in greater detail, including inspection of the bony walls of the socket 90 to evaluate the socket's suitability for implant placement. The user is then able to use the controls located in the control box 42 to choose a specific view of the mouth and determine what surgical procedures are necessary. Specifically, the user can view the honey walls of the socket 90 within the mouth and evaluate whether the socket is intact and if the immediate placement of the implant is permissible. To aid in viewing, the user may select a dental mouth mirror 74 from the toolkit 60 (FIG. 6) and use the haptic device 10 to angle or position the mirror 74 so as to provide a proper view of the inside of the mouth. If it is determined that the placement of the implant is permissible, the mouth 82 will remain open for the user to perform the necessary virtual surgical procedures to prepare the socket for the placement of the implant.

As shown in FIG. 6, a user can select the incision button 54 on the display screen to access the virtual simulation that focuses on making 310 an incision at a location on the model. In one example, selecting this button will begin the surgery and cause the program to cut a predetermined incision into the gingival over a tooth area 92. The virtual simulation will then retract the gingival flaps and expose the bone 94 underneath. In another example, the user may have control to freely make the incision at a location by selecting an incision tool 96 from the toolkit 60. The user will be able to move the stylus 14 in the real world environment to control the incision tool 96 and thereby make the incision at a location on the model. In another example, a user may select another method to gain access to the underlying bone, such as by selecting a tissue punch and using the punch to expose the underlying bone.

The user must decide the type of implant that should be used during the surgical procedure. In selecting 311 an implant, the user must consider various factors, such as the specific type of surgery that will be performed, the bone density associated with the implant site, and the type of implant site, as well as other considerations. In one example, a user must decide which type of implant to use based on the type of bone density at the implant site. The virtual simulator program may have the ability to randomize bone density by selecting multiple densities ranging from soft to hard that will affect the user's ability to place different types of implants. If, for example, the bone has a particularly soft density, a two-stage implant 64 might be used instead of a one-piece abutment 63. The user may also select the length and diameter of the two-stage implant that may best fit the surgical scenario, such as a 3.7×13 mm, 4.7×16 mm, or other diameters and length sizes. Many times, a user may consider factors such as the type of bone or the substance of the radiographs or imaging data and location the implant will be placed in determining the size, type, or design of the implant to use. If the bone has a relatively hard density, or a particular patient's medical history or biographical background is of an appropriate nature, then it may be possible to use a one-piece abutment 63.

In another example, a user must evaluate the surface of the implant site and determine what type of implant would best fit with the corresponding type of surface. In this example, a one-piece abutment 63 may be generally better suited for placement at a flat implant site, and a two-stage implant 64 may be better suited for placement at a tooth extraction type surface.

Figure 7:
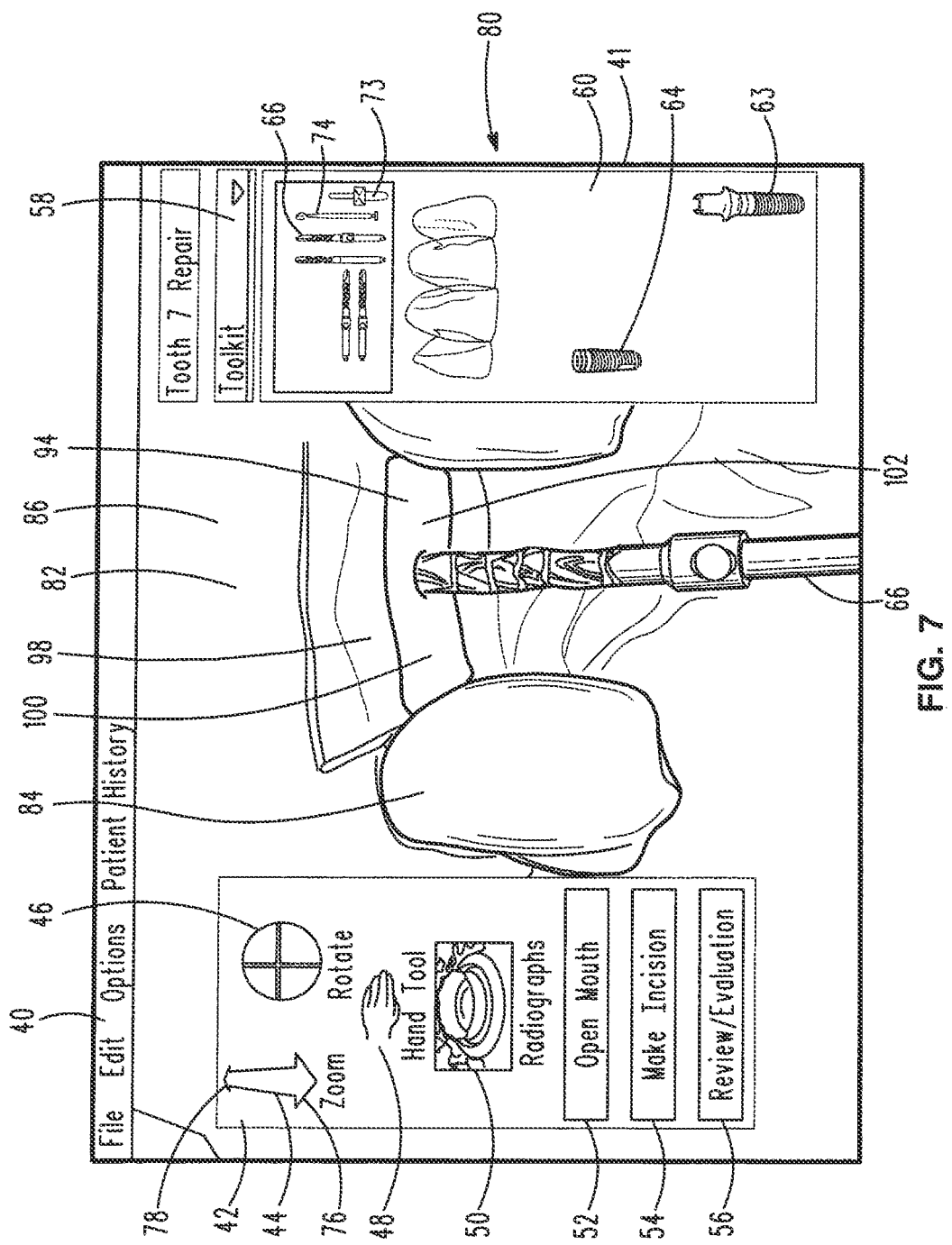
FIG. 7 is another computer screen display view of the bone implant surgery training system showing a drill procedure embodying features of the present invention.

As shown in FIG. 7, the virtual surgery may require a user to place the implant onto a healed edentulous site 98 at the location of the incision. Implant site 102 includes the healed edentulous site 98, which, in this case, may be more suitable for a one-piece abutment type implant 63. Placing a one-piece abutment type implant 63 at the implant site 102 may require different types of drills and guides than are used for the two-stage implant 64.

Therefore, if the user selects the one-piece abutment implant 63, the toolkit 60 will make available the necessary drills and guides needed for a user to place the one-piece abutment implant 63 at the implant site 102. In particular, the drills and guides that will generally not be used for inserting the one-piece abutment implant 63 may be colored gray and unavailable for user selection. To further determine what size implant should be placed, in one example, the user may select a periodontal probe and use the haptic device 10 to control the probe and measure the thickness of the bone surrounding the implant site 102 and determine what sized implant is appropriate. This may be instead of, or in addition to, radiographs of the patient and implant site mentioned above. In this case, the user will actually measure different dimensions of the implant site 102 on the radiograph to determine what size and length implant is appropriate.

Next, to start the drilling procedure, the user may select a drill handpiece 62 (FIG. 6) and drill bit 66 and begin the osteotomy on the exposed bone 100 by moving the stylus 14 of the haptic device 12 in the same manner as an actual drill. Different sized drills, surgical guides, and guide pins are used to create the proper sized hole at the drill site. The alignment of the osteotomy may be tested by placing drill bits within the osteotomy until the user is ready to complete drilling using a large sized drill bit that will provide a proper sized site for the implant 63.

During the simulation, the stylus 14 will vibrate and provide a resistance in the user's hand to provide the user with the actual feel of performing a surgical procedure using a drill. The haptic device 10 may also be configured to allow the user to feel the resistance associated with the surgical procedure while performing the procedure. The surgical simulator may provide a visual indicator on the display or an audio indicator to the user that indicates an undesired movement of the haptic device, therefore effecting an improper incision or placement of the implant. To increase the training benefits in the event of an undesired movement of the haptic device, the surgical simulator may provide an automatic display of the desirable motion of the simulated surgical tool in comparison to the actual undesirable position of the haptic device. This may occur in real-time during the simulation and later in the evaluation mode described below.

Figure 8:
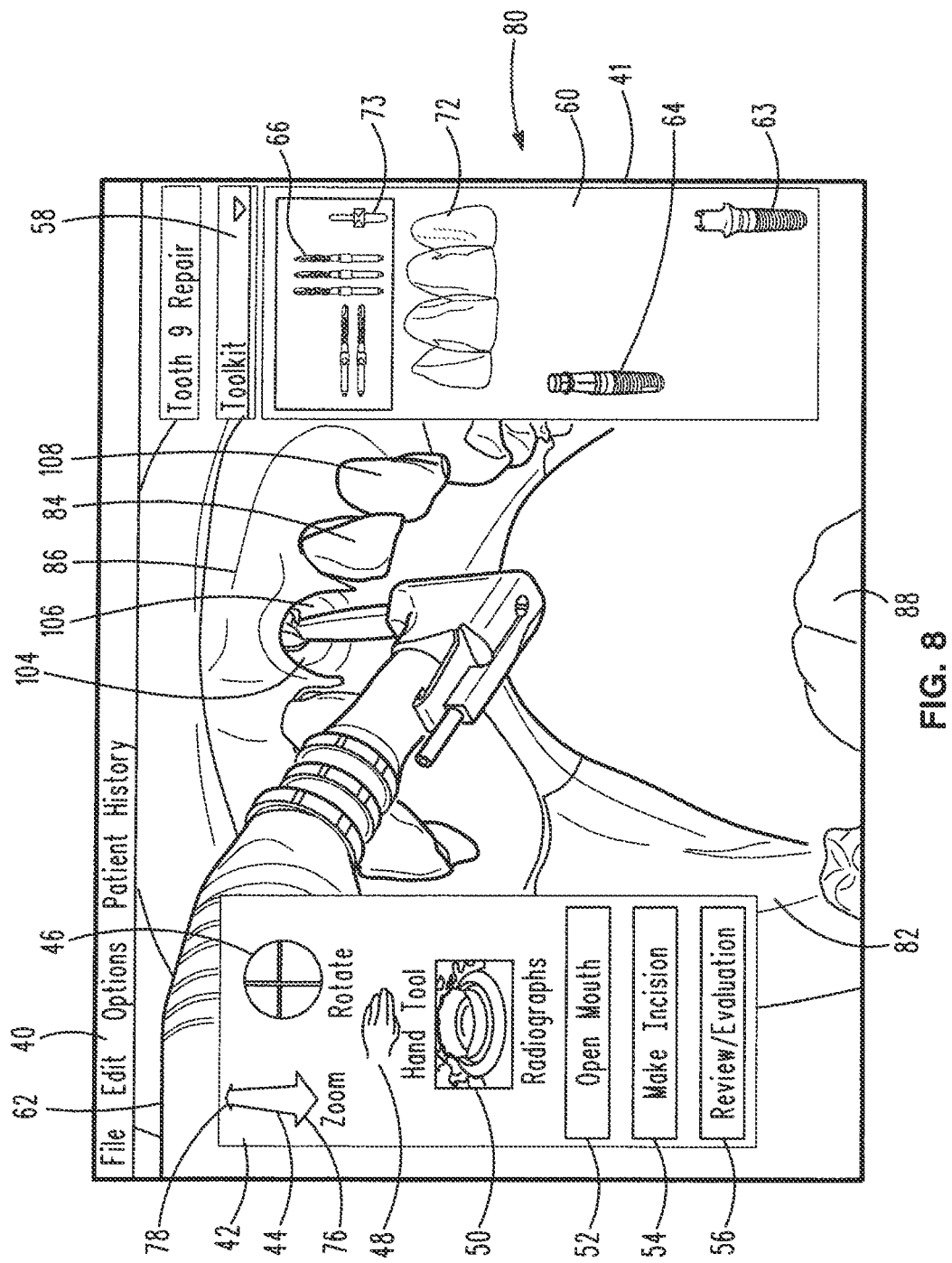
FIG. 8 is another computer screen display view of the bone implant surgery training system showing another drill procedure embodying features of the present invention.

As illustrated in FIG. 8, the surgery may require placement of an implant within a tooth socket 104. As generally known in the art, a two-stage implant 64 may be more suitably placed within an extraction site socket 106. As noted above, the necessary guides and drills needed to place a two-stage implant 64 into an implant site may be different than those needed to place a one-piece abutment implant 63 in an implant site. Once a user selects to perform the procedure using a two-stage implant 64, the necessary drills and guides will be available in the toolkit 60. As described above, the drills and guides that will not be used for such a procedure may be colored gray and made unavailable for user selection.

To place a two-stage implant 64 into an implant site, the user may use an input device such as a mouse, keyboard, or the haptic device 10 to select the surgical guide 72 from the toolkit 60 and position it over the extraction site 106. The surgical guide 72 may be aligned with the adjacent preexisting teeth 108. The user may use the haptic device 10 to control and press the surgical guide 72 firmly over the extraction site 106 so that it can be used to properly align the implant 64. The surgical guide 72 may be removed, and the user may begin drilling using the haptic device 10.

As illustrated in FIG. 8, the drill handpiece 62 is selected, and the smaller drill bit or bur may be used to make a pilot hole at the apex of the tooth socket 104. The tooth socket 104 may be too deep to accommodate the size of the smaller drill bit or bur. In this case, the user may select the drill extension from the toolkit 60 so that the end of the round bur can reach the apex of the socket 104. The drill extension helps avoid the head of the handpiece 62 from running into the tops of the adjacent preexisting teeth. A larger hole may be drilled using a larger drill 66 to make a channel for placement of a guide pin 73. The surgical guide 72 is selected again, and a tool may be inserted through the surgical guide 72 into the tooth socket 104 to evaluate the position and direction of the drilling. The guide pin 73 may be the tool that is chosen to be inserted through the guide 72 and into the tooth socket 104. However, in some instances, the guide pin 73 will be too short to fully reach within the socket 104, and a longer drill bit 66 may be selected as a substitute. The guide pin 73 or longer drill bit 66 will be used to determine the proper alignment of the pilot hole.

After it is determined that the position and direction of the pilot hole is proper, the user will remove the surgical guide 72 and guide pin 73 or drill bit 66, and the osteotomy is then completed using the larger drill bits located within the toolkit 60. As described above, the haptic device 10 may be used to manipulate and position the above tools used to complete the simulated dental surgery. As the user moves the haptic device 10, the surgical simulator 12 provides different vibrations and pressures associated with the surgical resistance to the haptic device 10 allowing the user to have a general feel of performing the actual surgery thereby increasing the training experience and virtual simulation.

Figure 10:
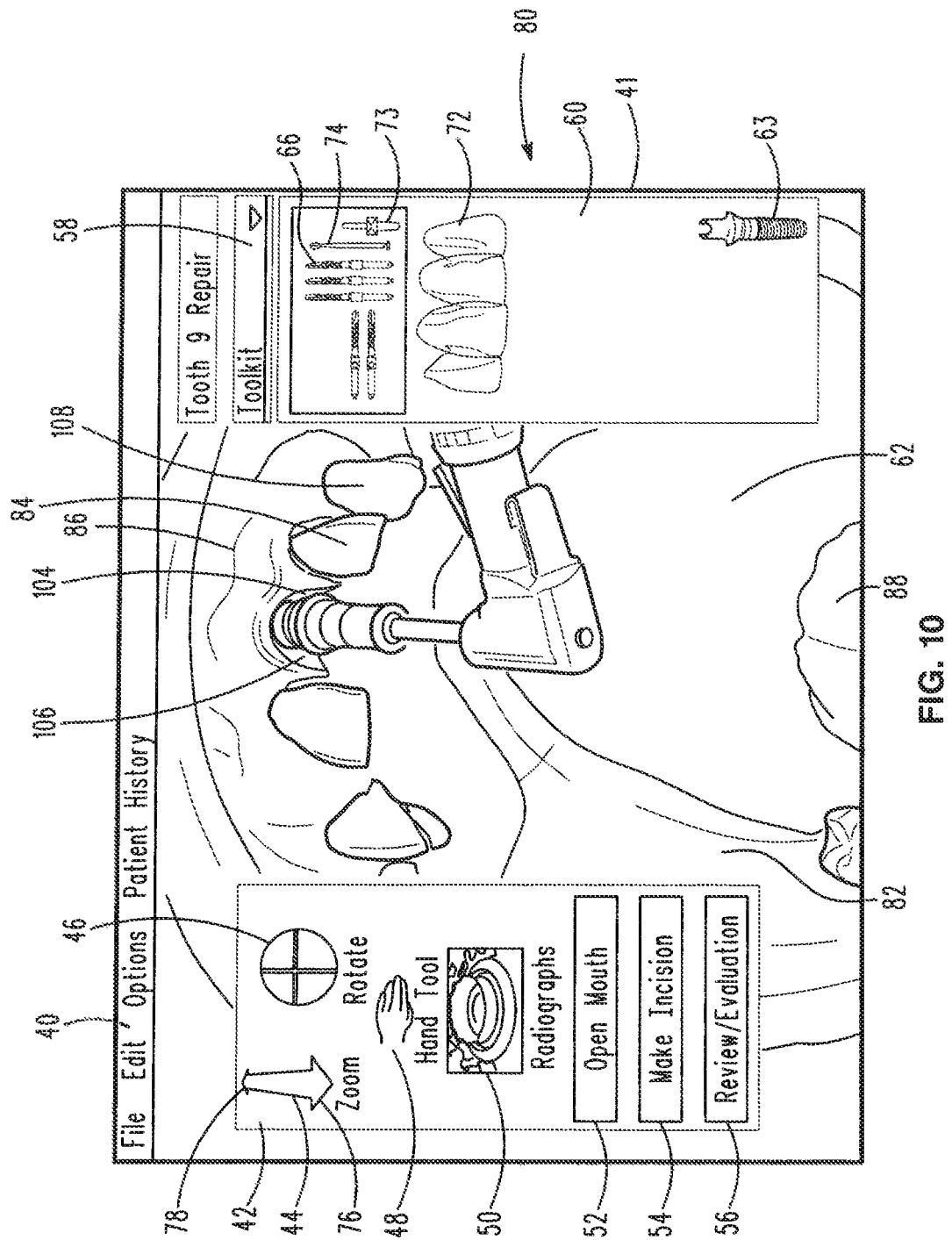
FIG. 10 is another computer screen display view of the bone implant surgery training system showing an implant procedure embodying features of the present invention.
Figure 11:
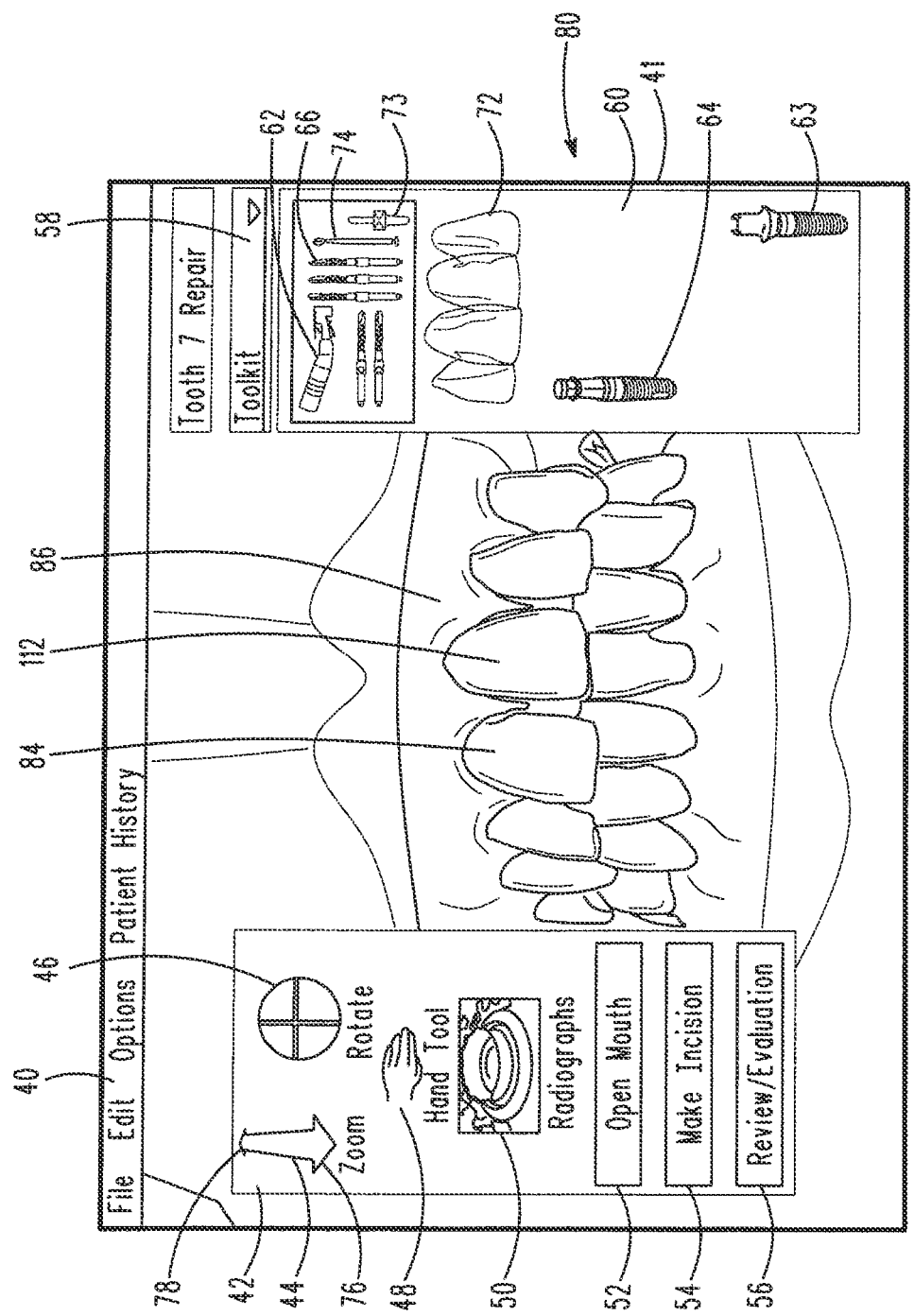
FIG. 11 is another computer screen display view of the bone implant surgery training system showing an evaluation interface embodying features of the present invention.

After drilling is complete, the user may place 314 the implant at the implant site using the implant interface. In one example, and as shown in FIG. 10, the user may select the two-stage implant 64 from the toolkit 60 for placement into the extraction site 106. The handpiece 62 may be selected and used to drive and thread the two-stage implant 64 into the extraction socket 104. The user will use the stylus 14 to control the displayed handpiece 62 and secure the implant within the extraction site 106. The stylus 14 will vibrate and provide a resistance in the user's hand to provide the user with a real life feel of inserting the implant 64 during a surgical procedure.

Figure 9:
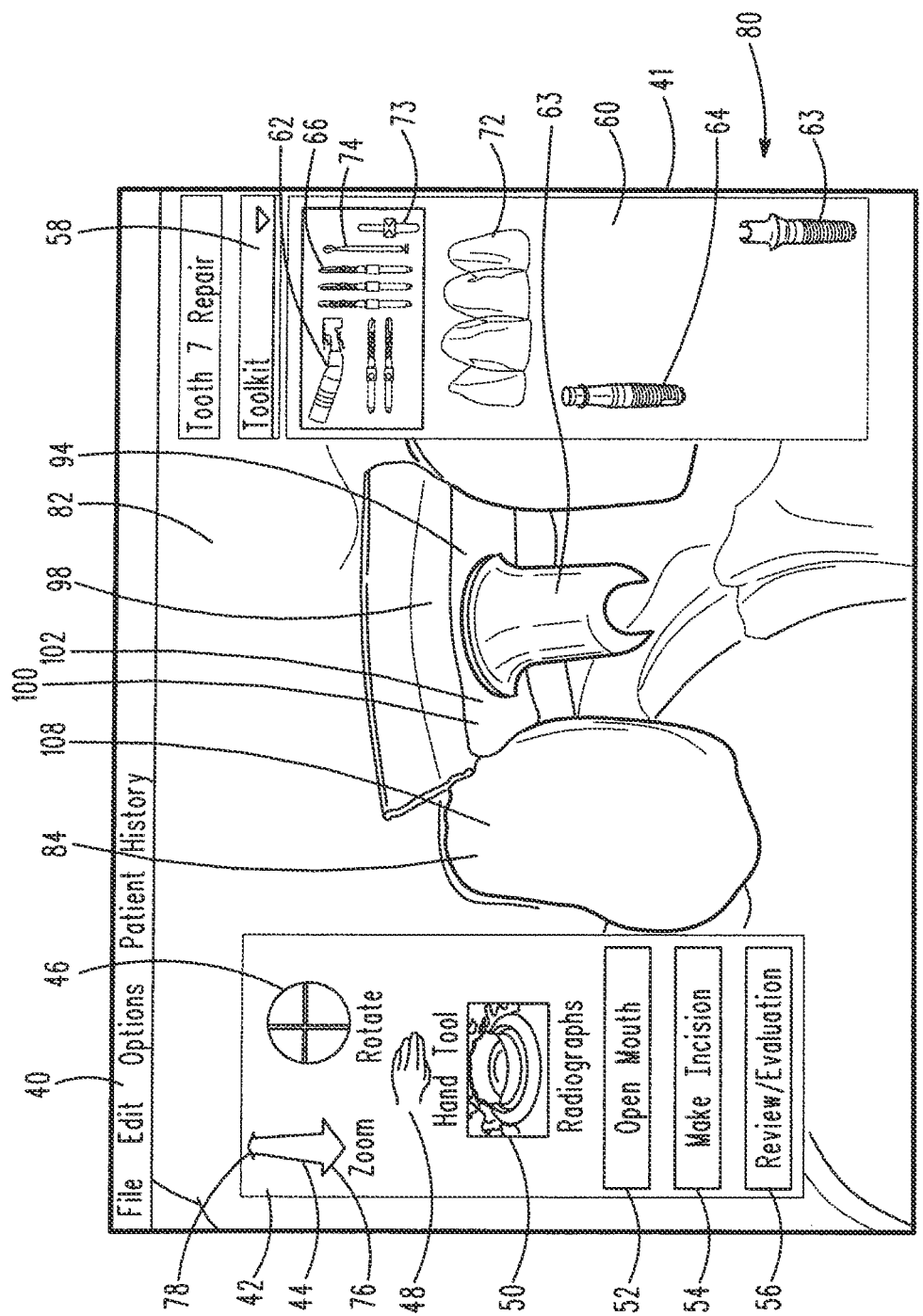
FIG. 9 is another computer screen display view of the bone implant surgery training system showing an implant procedure embodying features of the present invention.

In another example, and as shown in FIG. 9, a one-piece implant 63 is placed at the implant site 102. The handpiece 62 may be selected and used to drive and thread the one-piece implant 63 into an edentulous space. The user will use the stylus 14 to control the displayed handpiece 62 and secure the implant within the implant site 102. The stylus 14 will vibrate and provide resistance to movement to provide the user with a real life feel of inserting the implant 63 during a surgical procedure. Additionally, the user may place the implant, use the drill, or otherwise conduct the surgical procedure using the haptic device in at least one of three modes. In a first mode, the user may place the implant or drill freehandedly by moving the haptic device 10 or devices. In a second mode, a surgical guide may be used to guide the user's control of the haptic device 10 to place the implant or drill at the implant site. In a third mode, the system may create a custom digital surgical guide that will provide a force or resistance on the haptic device 10 and direct the handpiece at a proper direction, angle and depth to place an implant or drill at the implant site.

Once the implant is placed and the simulation has completed, the user or instructor may view the final product and evaluate the performance and accuracy of the surgery. In another example, the program may process and evaluate the type of implant used in relation to the various factors provided above and inform the user as to the correctness of the implant selection.

Figure 12:
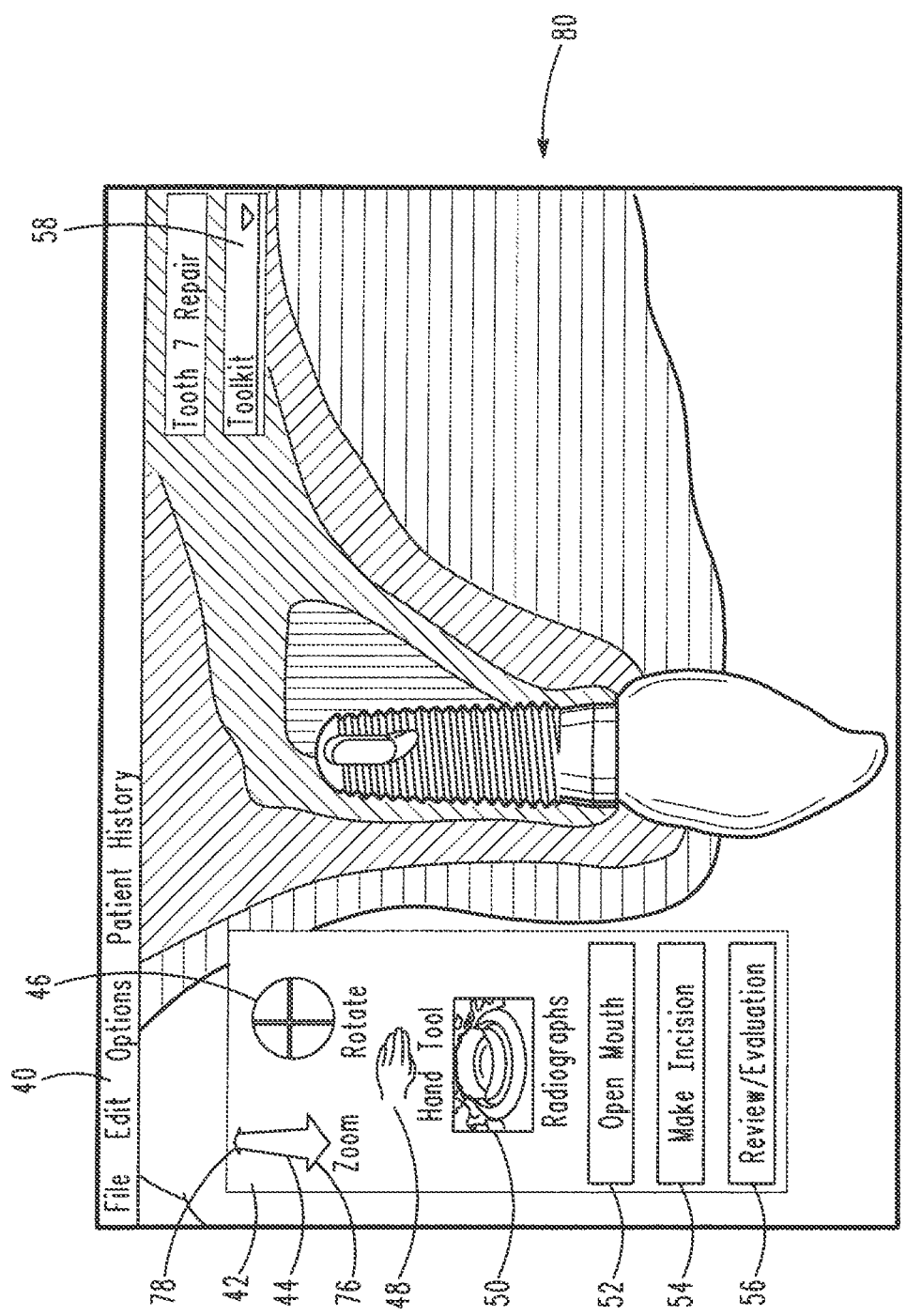
FIG. 12 is another computer screen display view of the bone implant training system showing another evaluation interface embodying features of the present invention.

In more detail, once the implants are placed, the user may select the Review/Evaluate button 56 to enter the evaluate interface to evaluate 316 the results of the simulation. In this example and referring to FIG. 11, the simulation provides a crown 112, which resembles an actual tooth, on top of the implant so the user will be able review the placement of the implant as it would look in its completed phase. The Review/Evaluate mode allows the user to manipulate the zoom 44, rotate 46, and hand tool 48 buttons located in the control box 42 to visually evaluate the results of the simulation. In another example, the Review/Evaluate mode, allows the user to receive feedback from the surgical procedure by viewing the results of the completed surgical simulation from different views. As illustrated in FIG. 12, the user will be able to view a cross-section of the implant to further visually evaluate the angle and position of the implant.

Additionally, the Review/Evaluate mode allows the user to toggle between a straight abutment and an angled abutment and evaluate the different crowning positions that result from the different abutments. The Review/Evaluation mode will place a crown on the implant at the proper angle and disposition. This allows the user to visually perceive the proper location of the crown and whether the user made an error in placing the implant. The user may then toggle between the implant placed at the undesirable angle to an implant placed at a proper straight angle allowing the user to compare the two crowns. This feedback will aid the user to avoid such error in the next practice session.

The user may actuate the zoom button 44 to zoom out and view the patient's smile during the Review/Evaluate mode.

This allows the user to evaluate the results of the virtual simulation as a whole in relation to the patient's smile. The user will be able to select to view a "low smile line" or a "high smile line." The low smile line provides a view of the patient's smile where the patient's lips extend over the gingival and the user sees only the patient's teeth. The "high smile line" shows the patient's lips separated to expose the patient's gumline. This allows the user to view any imperfections located on the gingival and gumline that exist or were a result of the surgery.

It will be appreciated that the features described above can be applied to any proposed osseous surgery where metal or other materials will be placed into bone with great accuracy on the part of the operating surgeon. This includes minimally invasive techniques that place screws or similar devices into the spiral column. Practicing procedures prior to surgery as described herein helps improve surgical skills and reduce operating time and intra-operative radiation exposure. Thus, it will be understood that the anatomical data described herein may be used to build models for other osseous surgeries other than dental such as for implant surgeries at the spine, knee, hip, elbow, and so forth.

It will be understood that various changes in detail, materials and arrangements of parts, components and steps which have been described herein and illustrated in order to explain the nature of the simulation system may be made by those skilled in the art within the principle and scope of the device and system expressed in the appended claims. Furthermore, while various features have been described with regard to a particular embodiment, it will be appreciated that features described for one embodiment may also be incorporated with the other described embodiments.

What is claimed is:

1. A system for simulating a bone implant surgery comprising:
   a display showing a simulated implant site on a virtual living body, a simulated bone implant, a simulated surgical tool, and a toolkit providing at least one tool for the simulated surgical tool;
   a hand-held haptic device corresponding to the simulated surgical tool, the haptic device including a virtual surgical site orientor, including a base, a ring, and a secondary strut, configured to orient the hand-held haptic device in a surgical relationship; and
   at least one controller communicating with the display and the haptic device and configured to cause movement of the simulated surgical tool on the display based on motions of the haptic device and to cause haptic feedback to a user holding the haptic device depending on positioning of the simulated surgical tool on the display and the at least one tool selected,
   wherein the system simulates and displays the placement of the simulated bone implant relative to the simulated implant site.

2. The system of claim 1 wherein the simulated implant site includes multiple types of simulated bone tissues.

3. The system of claim 1 wherein the simulated bone implant site represents one of a plurality of available simulated implant sites from the system and wherein each implant site provides a different experience for the user.

4. The system of claim 3 wherein the simulated implant sites comprise at least one of making an incision at an implant site in a small mouth and placing an implant in close proximity to at least one of nerves, blood vessels, sinuses, floor of a nose, or adjacent teeth.

5. The system of claim 1 wherein the simulated bone implant site is based on data from a real patient in need of an implant procedure.

6. The system of claim 5 wherein the simulated bone implant site is developed with simulated non-bone tissue placed over simulated bone tissue, and wherein data from the real patient is only used to develop the simulated bone tissue.

7. The system of claim 1 wherein the simulated implant site is a portion of a simulated region of the living body, and wherein the simulated implant site includes more data than the remainder of the simulated region of the living body.

8. The system of claim 7 wherein the simulated region of the living body is an oral cavity, and the simulated implant site comprises a dental bone implant site to receive a dental implant to support at least one prosthetic tooth.

9. The system of claim 2 wherein an amount of force to move the haptic device varies depending on the type of simulated anatomical tissue engaged by the simulated surgical tool on the display.

10. The system of claim 9 wherein the system provides different feedback to the haptic device for different bone densities encountered by the simulated bone implant while manipulated by the simulated surgical tool.

11. The system of claim 1 further comprising visual or audible indication of an undesirable motion or placement of the simulated surgical tool.

12. The system of claim 1 further comprising a review and evaluation mode to analyze a simulated procedure.

13. The system of claim 1 further comprising an automatic display of desirable positioning or motion of the simulated surgical tool different from actual positioning of the simulated surgical tool.

14. The system of claim 1 wherein the simulated implant site is selectively viewable from different angles.

15. The system of claim 1 wherein the simulated implant site includes the human jaw, spine, knee, hip, or elbow.

16. A system for simulating a dental implant surgery comprising:
   a display for showing a simulated dental implant mounted with a simulated surgical tool;
   a hand-held haptic device corresponding to the simulated surgical tool, including a base and a secondary strut;
   a ring defining an opening, the opening configured to receive at least a portion of the hand-held haptic device; and
   at least one controller communicating with the display and the haptic device and configured to cause movement of the simulated surgical tool on the display based on motions of the haptic device within the opening of the ring, and to cause haptic feedback to a user holding the haptic device depending on positioning of the simulated surgical tool on the display;
   wherein the system simulates placement of the dental implant.

17. A method of simulating a dental implant surgery comprising:
   generating a simulation of a jaw visible on a display including generating simulated bone tissue based on dimensions from an actual patient in need of a dental surgery implant;
   generating simulated soft tissue and displaying the simulated soft tissue on the simulated bone tissue; and
   controlling a simulated surgical tool for holding a simulated implant shown on the display by manipulating at least one hand-held haptic device, the at least one hand-held haptic device including a virtual surgical site orientor, including a base, a ring, and a secondary strut, configured to orient the hand-held haptic device in a surgical relationship.

18. The method of claim 17 wherein the simulated bone tissue may represent multiple bone densities.

19. A method of simulating a dental implant surgery on a jaw comprising:

generating a high data area at least at one implant site on the jaw and a low data area on the remainder of the jaw;

displaying the simulation of the jaw on a display device, wherein the high and low data areas are visibly indistinct; and controlling a simulated surgical tool for holding a simulated implant shown on the display device by manipulating at least one hand-held haptic device, the at least one hand-held haptic device including a virtual surgical site orientor, including a base, a ring, and a secondary strut, configured to orient the hand-held haptic device in a surgical relationship.

20. The method of claim 19 wherein at least one CATs scan image is used to generate the simulation of the jaw.

21. The method of claim 19 wherein generating the high data area comprises using bone voxel data associated with the at least one implant site to simulate and display the implant site.

22. The method of claim 19 wherein generating the high data area comprises using bone voxel data that simulates only a single implant site.

\* \* \* \* \*

UNITED STATES PATENT AND TRADEMARK OFFICE
CERTIFICATE OF CORRECTION

PATENT NO. : 8,662,900 B2
APPLICATION NO. : 12/790140
DATED : March 4, 2014
INVENTOR(S) : Bell, III et al.

Page 1 of 1

It is certified that error appears in the above-identified patent and that said Letters Patent is hereby corrected as shown below:

In the Claims

In column 15, line 17, in Claim 20, delete "CATs" and insert --CAT--, therefor

Signed and Sealed this
Twenty-fifth Day of November, 2014

Michelle K. Lee
*Deputy Director of the United States Patent and Trademark Office*